Feb. 18, 1930.  C. L. COOK  1,747,929
PACKING RING
Filed April 19, 1928
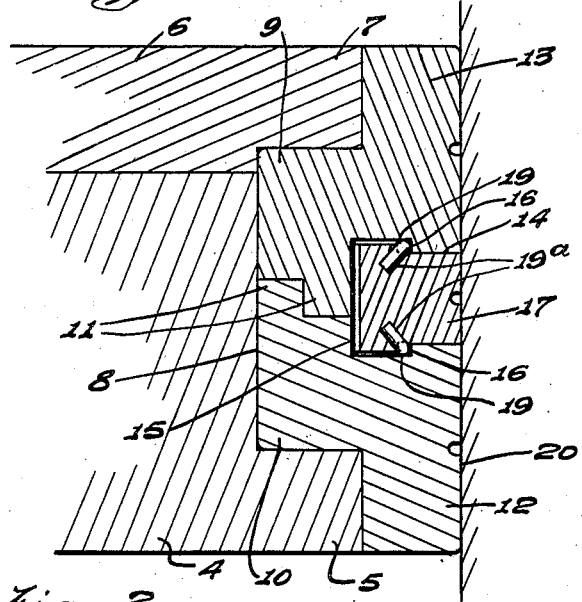
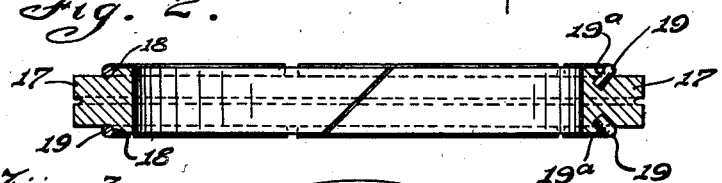
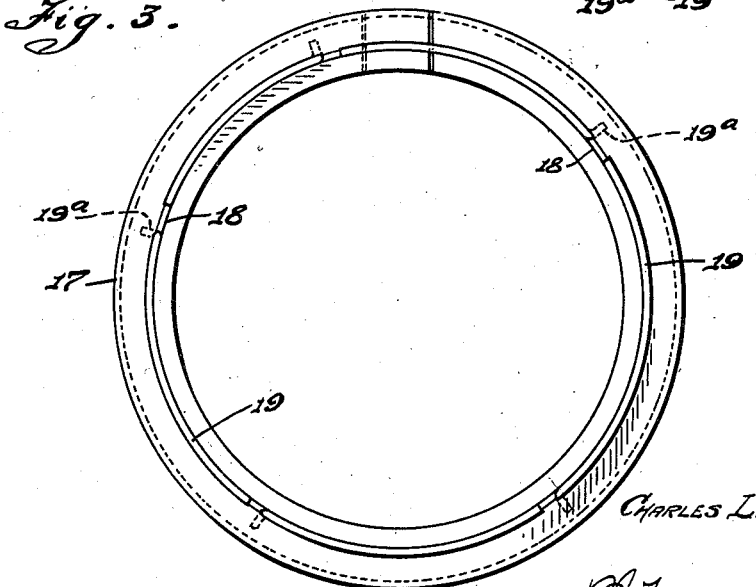
Inventor
CHARLES LEE COOK Patented Feb. 18, 1930

1,747,929

UNITED STATES PATENT OFFICE

CHARLES LEE COOK, OF LOUISVILLE, KENTUCKY

PACKING RING

Application filed April 19, 1928. Serial No. 271,297.

The present invention relates to piston structures, and particularly the packing means therefor.

The object is to provide a relatively simple structure that is easy to manufacture and constitutes an effective packing between the piston and the cylinder wall.

In the accompanying drawings:

Figure 1 is a detail sectional view of a portion of a piston constructed in accordance with the present invention.

Figure 2 is a sectional view through the packing ring.

Figure 3 is a plan view of said ring.

In the structure disclosed, the piston body is designated 4, and is provided with an annular flange 5. A cap 6 is suitably secured to the piston body in any well-known way, and has an annular flange 7. As a consequence an annular groove 8 is formed between the flanges 5 and 7.

In the groove 8 are placed continuous "junk" rings 9 and 10, these rings having their inner portions provided with overlapped step sections 11. The rings 10 further have outstanding flanges 12 and 13 that overlie respectively the flange 5 of the piston body and the flange 7 of the cap. The outer portions of the "junk" rings 9 and 10 are spaced apart, and thus form between them an annular groove 14, the inner portion of which is enlarged to provide an internal chamber 15, so that the groove as a whole is generally T-shaped in cross section and has internal shoulders 16.

A "snap" ring, namely, an expansible elastic packing ring, is located in the groove 14—15 and is also T-shaped in cross section. This ring is designated 17, its larger portion being located in the chamber 15 and its shoulders 18 being disposed in opposition to the shoulders 16. Interposed between the shoulders 16 and 18 are rings 19 of deformable material, softer than the material of the rings 12, 13 and 16. For instance, copper may be employed, and these rings are preferably of sections with offset ends 19ᵃ engaged in sockets in the ring 17.

Inasmuch as the "junk" rings 12—13 fit snugly the cylinder wall 20, a relatively small amount of fluid under pressure will in any event pass the piston, but with the packing ring, even this amount is greatly reduced, if not entirely prohibited, because the packing ring is pressed outwardly, but this outward pressure is resisted by the rings 19, which, however, as the packing ring wears, will become deformed or pressed out of shape and allow for sufficient expansion. Because the space behind the expansion ring is so far removed from the initial source of pressure on the piston, the labyrinthian theory is here present, to wit, the working pressure will be greatly reduced by the time the fluid passes down the upper half of the "junk" ring to the packing ring, thereby eliminating much of the work the piston ring must perform. Furthermore what pressure should accumulate in the ring and pass through will again be retarded by reason of the labyrinthian process on the lower "junk" ring.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

What I claim, is:

1. A piston comprising a flanged body and a flanged cap, forming between the flanges an annular groove, interfitted junk rings in the groove having flanges overlying the flanges of the body and cap, said junk rings having their outer portions inset and spaced apart and forming internal shoulders and a groove that is substantially T-shaped in cross section, an expansible spring packing ring substantially T-shaped in cross section and located in the T-shaped groove, and deformable rings of softer material than the rings interposed between the shoulders of the packing ring and the internal shoulders of the junk ring.

2. A piston having an annular groove, junk rings located in the groove and having their inner sides interfitted and having outstanding flanges overlying the piston on opposite sides of the groove, said rings also having inset portions forming between the junk rings a groove that is substantially T-shape in cross section, and an expansible packing ring of substantially T-shape in cross section located in the T-shaped groove.

In testimony whereof, I affix my signature.

CHARLES LEE COOK.